(12) United States Patent
Presby et al.

(10) Patent No.: US 6,643,467 B1
(45) Date of Patent: Nov. 4, 2003

(54) METHOD AND APPARATUS FOR CONTROLLING RECEIVED POWER LEVELS WITHIN A FREE SPACE OPTICAL COMMUNICATION SYSTEM

(75) Inventors: Herman Melvin Presby, Highland Park, NJ (US); John A. Tyson, Pottersville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/680,165

(22) Filed: Oct. 5, 2000

(51) Int. Cl.⁷ .............................................. H04B 10/00
(52) U.S. Cl. ...................... 398/120; 398/118; 398/119; 385/31
(58) Field of Search .................... 385/31, 147; 359/110, 359/154, 159, 187, 188, 189, 180, 193, 194, 195, 399, 410, 414, 429, 430; 250/206.2; 356/139.05, 139.06, 139.07, 139.08, 141.1, 141.2, 141.3, 141.5, 153

(56) References Cited

U.S. PATENT DOCUMENTS

| | | | |
|---|---|---|---|
| 4,307,294 A | 12/1981 | Campbell | 250/201 |
| 4,330,870 A | 5/1982 | Arends | 455/617 |
| 4,928,317 A | 5/1990 | Franchini | 455/601 |
| 4,960,315 A | 10/1990 | Kostal et al. | 350/96.18 |
| 5,475,520 A | 12/1995 | Wissinger | 359/172 |
| 6,462,847 B2 * | 10/2002 | Willebrand | 359/152 |

FOREIGN PATENT DOCUMENTS

| | | | |
|---|---|---|---|
| DE | 37 16 896 | 5/1987 | H04B/9/00 |
| EP | 0 653 852 | 11/1994 | H04B/10/10 |
| EP | 0 724 340 | 1/1996 | H04B/10/10 |
| EP | 0 880 242 A | 11/1998 | H04B/10/10 |
| EP | 0 902 557 | 3/1999 | H04B/10/10 |
| GB | 2 331 882 | 2/1999 | H04B/10/10 |
| JP | 2000-147324 A1 * | 5/2000 | G02B/6/42 |
| WO | WO 00/54413 | 9/2000 | |

OTHER PUBLICATIONS

U.S. patent application Ser. No. 09/680,336, Presby, filed Oct. 5, 2000.
U.S. patent application Ser. No. 09/679,159, Presby, filed Oct. 5, 2000.

* cited by examiner

*Primary Examiner*—Brian Healy
*Assistant Examiner*—Kevin S Wood
(74) *Attorney, Agent, or Firm*—David W. Herring, Jr.

(57) ABSTRACT

A free space optical communication system is disclosed whereby the received power at the receive optical fiber is reduced by adjusting the transmitted light beam and/or the receive optical fiber with respect to each other when a specified power threshold is exceeded. This reduction in received power is achieved by either increasing the cross section of the transmitted beam relative to the receive telescope or, alternatively, moving the receive optical fiber and thereby enlarge the cross section of the received beam incident upon the receive optical fiber.

26 Claims, 4 Drawing Sheets

METHOD AND APPARATUS FOR CONTROLLING RECEIVED POWER LEVELS WITHIN A FREE SPACE OPTICAL COMMUNICATION SYSTEM

CROSS-REFERENCE TO RELATED APPLICATIONS

This application claims subject matter that is described in co-pending United States Patent Application filed simultaneously herewith and entitled "Method and Apparatus for Aligning Telescopes Within A Free Space Optical Communication System," Ser. No. 09/680,336, and United States Patent Application filed simultaneously herewith and entitled "Telescope for Free Space Optical Communication System," Ser. No. 09/679,159.

FIELD OF THE INVENTION

The present invention is related generally to data communication systems and, in particular, to free space optical data communication networks.

BACKGROUND OF THE INVENTION

Traditional telecommunication systems that connect two or more sites with physical wire or cable are generally limited to relatively low-speed, low-capacity applications. In order to address these limitations, recently developed systems utilize optical fibers. Yet, fibers still require a physical cable connection. To remove this limitation, systems utilizing the free space transmission of one or more light beams modulated with data have been developed. Systems using such beams greatly improve data speed and capacity rates, up to 10 Gigabytes per second, over traditional wire-based systems and, at the same time, avoid the traditional communication system infrastructure cost of laying fiber cable to physically connect one site in the system to another. Instead of cables, free space optical communications systems consist, in part, of at least one transmit telescope and at least one receive telescope for sending and receiving information, respectfully, between two or more communications sites. Each of these telescopes contains optics, consisting of at least a primary mirror and a secondary mirror or a lens. The transmit telescope uses its optics to transmit the light beam to the receive telescope. The receive telescope uses its optics to focus the incoming light beam onto the focal plane of the telescope. Generally, each telescope is attached to a communications network or other source/destination of information. In operation, the transmit telescope receives information from its respective network via cable or wireless transmission, and then transmits a light beam modulated with this information to one or more destination receive telescopes. Each receive telescope then relays data to its intended destination in its respective network via a cable or wireless transmission.

The aforementioned free space communications systems would, therefore, appear to have the benefits of reducing costs associated with installing and maintaining physical hard-wired portions of networks while, at the same time, increasing transmission capacity. However, free space optical communications may be hampered by a variety of factors. For example, since the transmit and receive telescopes may be located a great distance from each other, initial alignment of the telescopes, to insure that the transmitted light beam is incident upon the focal plane of the receive telescope, may be difficult to achieve. Additionally, even if initially aligned, misalignment of the transmit and receive telescopes may result from any displacement of the light beam during transmission or any movement of either the transmit or receive telescopes or their respective physical mounting platforms. As a result of such misalignment, the transmitted light beam may not be incident upon the focal plane of the receiving telescope, or may only be partially incident thereupon, leading to a loss or degradation of communications connectivity.

Another problem with free space optical communications results from the variation in atmospheric conditions. Specifically, since conditions like fog or snow can interfere with the transmitted light beam in such systems, the transmit telescope must produce a light beam with power sufficient to maintain communications connectivity in such variable conditions. In the absence of such signal-degrading conditions, however, the power of the received light beam may overload the electronics of the receive telescope. While the power to the laser or laser amplifier can be reduced to compensate, this may mean operating the devices at gains where they do not operate efficiently. It would be highly desirable, therefore, to operate devices at a fixed power level sufficient for the worst expected condition and then attenuate the beam when necessary. A means for providing this attenuation is needed.

SUMMARY OF THE INVENTION

The aforementioned problems related to the receive telescope receiving from the transmit telescope a light beam having excessive power during communications operations are essentially eliminated with the present invention. In accordance with the present invention, the transmitted light beam and the receive optical fiber are adjusted with respect to each other when a specified power threshold is exceeded so that they intersect not at a point of focus, but at a point of divergence of the transmitted beam. At such a point, the cross-sectional area of the transmitted beam is larger and the received power per unit area is lower, thereby reducing the input power to the receive optical fiber.

In accordance with a first embodiment of the present invention, the divergence of the transmitted light beam is varied so as to effectively increase the cross-sectional area of the beam that is incident upon the receive telescope. This divergence of the transmitted beam is accomplished by moving the optical fiber, located at the focal plane of the primary mirror of the transmit telescope, to a point in front of the focal plane in the z-direction along the longitudinal axis of transmit telescope. The resulting beam produced by the transmitted telescope increases the cross-sectional area of the transmitted beam at the receive telescope. This larger cross section correspondingly results in a lower received power per unit area of the cross section. Therefore, any point on the focal plane of the receive telescope will be exposed to a lower power level per unit area and the receive optical fiber, at the focal plane of the receive telescope, will also receive a signal with reduced power. A similar reduction in power level per unit area may be achieved by moving the transmit optical fiber to a point to the rear of the focal plane in the z-direction along the longitudinal axis of the transmit telescope. Such a movement will result in a converging transmitted beam, which is more susceptible to atmospheric disturbances due to the resulting smaller beam cross section. However, the use of adaptive optics or other corrective measures will compensate for any signal interference resulting from such disturbances. By monitoring signal power at the receive telescope and providing feedback to the transmit telescope, the divergence of the transmitted beam is varied until the power level at the focal plane of the receive telescope is reduced to or below a specified threshold. If weather conditions deteriorate from optimum conditions, the transmit optical fiber can be moved back to a point closer to the focal plane along the z-axis of the transmit telescope's primary mirror such that the transmitted beam achieves greater focus and, hence, greater power per unit cross sectional area.

Alternatively, in a second embodiment of the present invention, instead of moving the optical fiber at the transmit telescope, the optical fiber located at the focal plane of the primary mirror of the receive telescope may be moved to a point to the rear of the focal plane of the receive telescope in the z-direction along the longitudinal axis of the receive telescope. Alternatively, to achieve a similarly reduced signal power, the receive optical fiber may be moved to a point in front of the focal plane along the longitudinal axis of the receive telescope. Such a movement would not result in degraded received signal quality as may occur in the case of moving the transmit fiber. Since the maximum possible received power is achieved at the focal point within the focal plane, any movement of the receive optical fiber away from the focal point along the z-direction will result in a reduction of the received power. Once again, by monitoring received signal power, and adjusting the position of the received optical fiber, received power can be either increased or decreased as necessary.

DETAILED DESCRIPTION OF THE INVENTION

Figure 1:
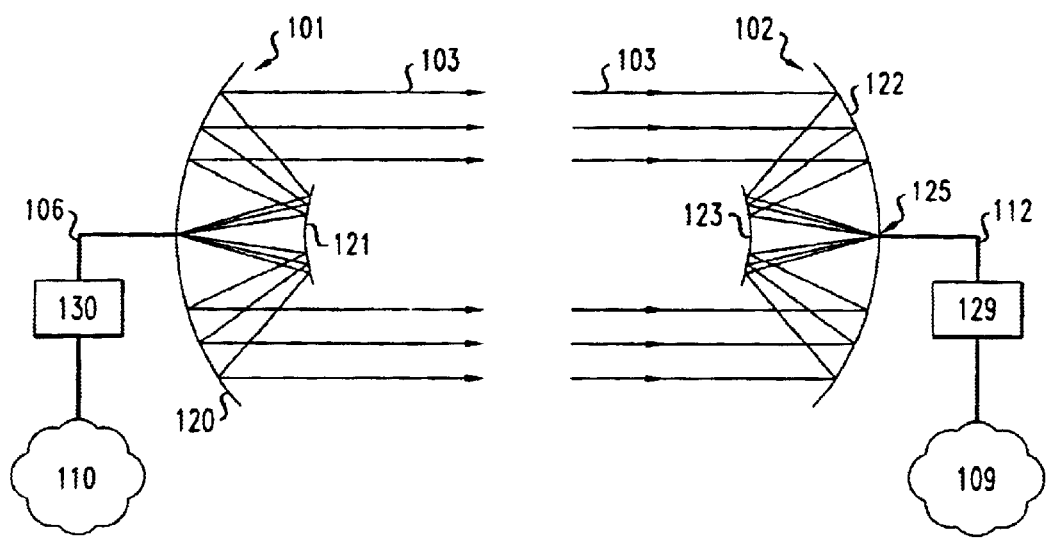
FIG. 1 shows an optical communication system using a prior art telescope apparatus during normal communications conditions.

FIG. 1 shows a diagram of two prior art telescope optical communication telescopes, 101 and 102, during normal aligned operating conditions in a free-space optical communications system. Laser 130 produces an optical light beam that is modulated with data received from network 110 and transmitted on optical fiber 106. The transmit telescope 101 receives the modulated optical signal via optical fiber 106. Then, the primary mirror 120 and secondary mirror 121 optically shape and transmit the modulated light beam such that the beam is incident upon the focal plane 125 of receive telescope 102. Receive telescope 102 utilizes its optics, consisting of a primary mirror 122 and a secondary mirror 123, to focus the incident transmitted modulated light beam 103 onto the receive optical fiber 112 at the focal plane 125 of the receive telescope 102. The receive optical fiber then transmits the modulated optical signal to receiver 129 which converts the optical signal to an electrical signal, demodulates the data, and forwards the data to network 109.

Figure 2:
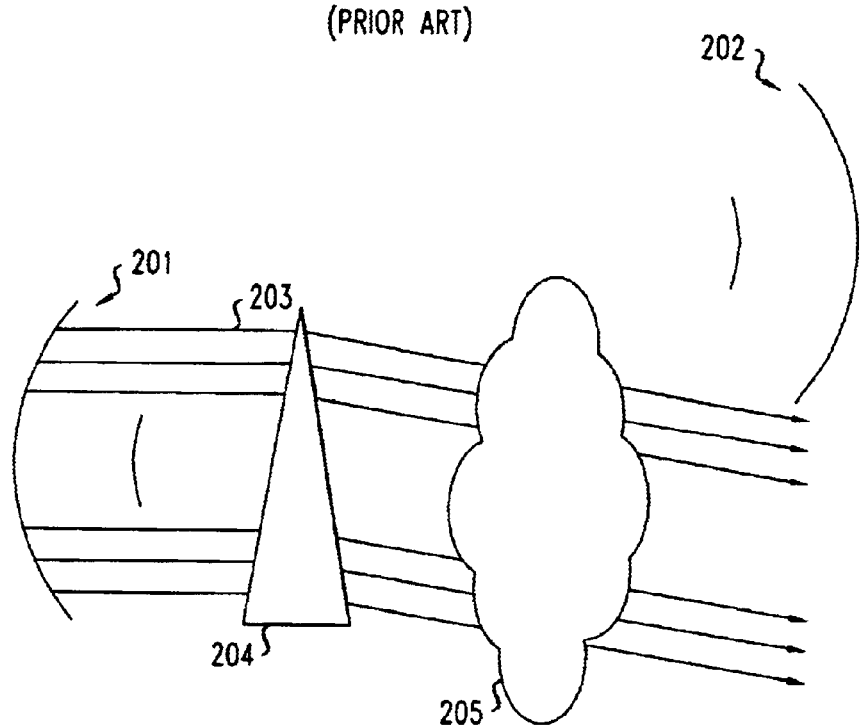
FIG. 2 shows an optical communication system using a prior art telescope apparatus wherein interference such as turbulence or attenuation between the receive and transmit telescopes causes the degradation or loss of communications.

In certain situations, however, the light beam transmitted by transmitting telescope 101 may not be incident upon the optical fiber at the focal plane of the receive telescope 102. For example, installation of the telescopes will require an initial alignment to insure that the transmitted beam is incident upon the focal plane of the receive telescope. This is necessary to establish initial communications connectivity between the transmit and receive telescopes. Also, as shown in FIG. 2, atmospheric interference, such as turbulence 204 or attenuation 205, anywhere along the path between telescopes 201 and 202, may cause the transmitted beam 203 to deviate from the direct path between the transmit and receive telescopes such that it partially or entirely misses the receive telescope 202. The result is the loss or degradation of communications between the two telescopes. In this case, realignment may be necessary to possibly reestablish communications and to maximize received signal power.

Figure 3:
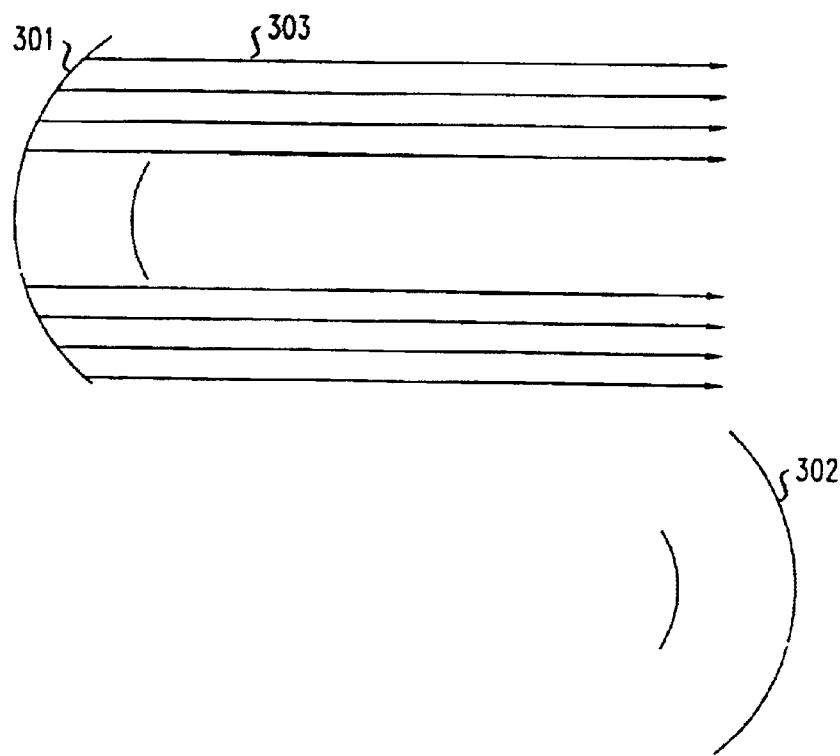
FIG. 3 shows an optical communication system using a prior art telescope apparatus wherein relative movement between the transmit and receive telescopes causes the loss or degradation of communications.

FIG. 3 shows another prior art situation where the light beam transmitted by the transmit telescope is not incident upon the receive telescope's focal plane. In this case, transmit telescope 301 transmits light beam 303, which is not incident upon the receive telescope 302 due to initial misalignment or relative movement between the transmit and receive telescopes during communications operations. Such movement during communications operations could result from high wind conditions, movement of the underlying support structure, or any number of other potential causes.

Figure 4:
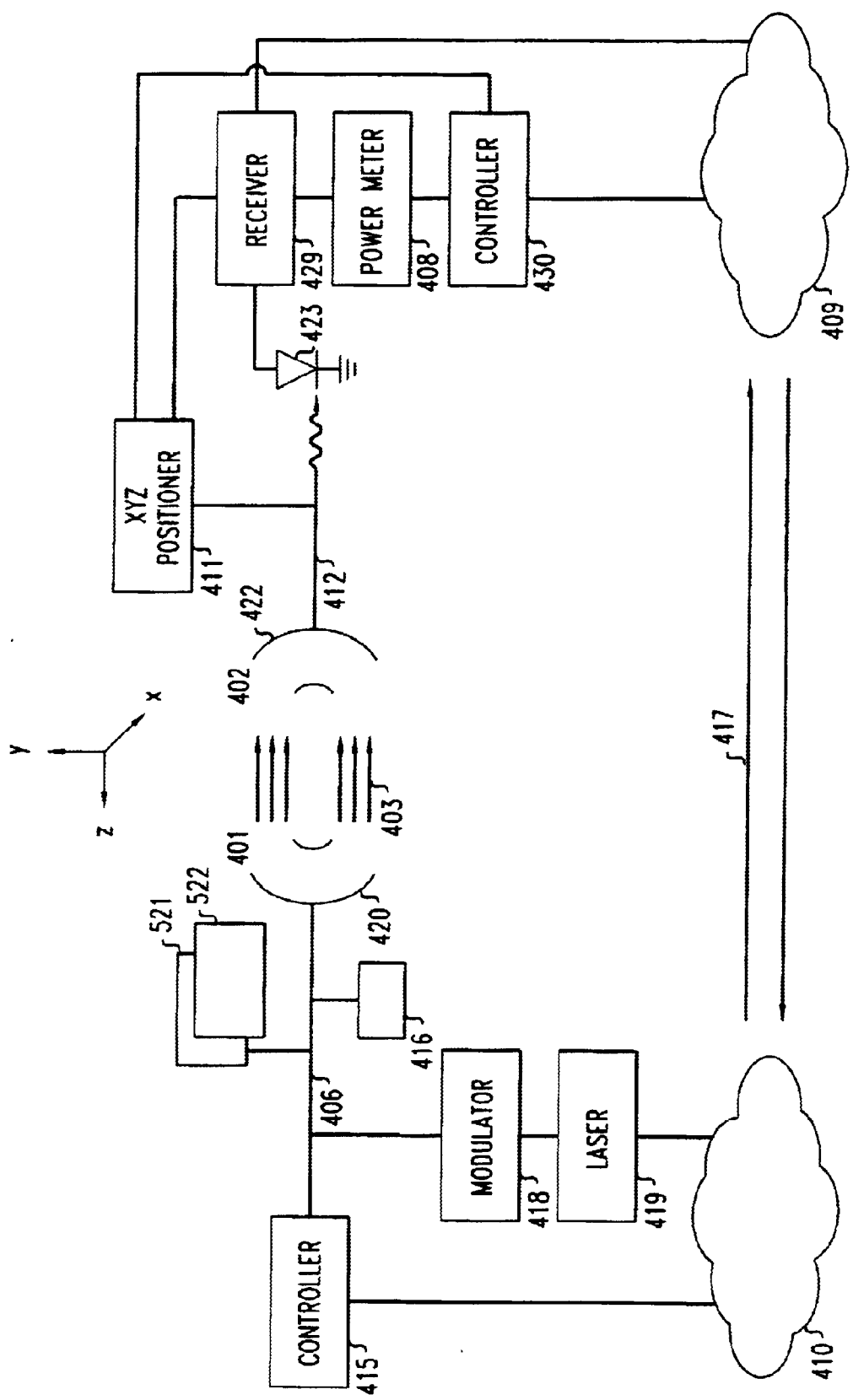
FIG. 4 shows an optical communication system consisting of a telescope with moveable optics to facilitate alignment of the transmit and receive telescope.

FIG. 4 shows one embodiment of the present invention that utilizes variable divergence of the transmitted light beam to initially align the transmit and receive telescopes and/or to realign a misalignment of the transmit and receive telescopes during communications, as discussed above. In the free-space telecommunications system in FIG. 4, laser 419 produces a light beam that can be modulated by modulator 418 with data from network 410. This modulated light beam is then transmitted to telescope 401 which shapes the beam 403 so that it is incident on the focal plane of receive telescope 402, which is connected to network 409. Although there may be a physical, hard-wired, relatively low-bandwidth connection 417 between networks 409 and 410, the free-space system provides a high-speed and high-capacity link between these networks.

In accordance with the present invention, prior to initial alignment, the transmitted light beam may not be incident upon the focal plane of the receive telescope 402. Thus, referring to FIG. 5, during initial alignment of the telescopes the optical fiber 406 at the focal plane of the transmit telescope is moved in the z-direction to a point in front of the focal plane along the transmit telescope's longitudinal axis of its primary mirror 420 thereby causing light beam 504 to diverge as it is transmitted from the transmit telescope. Thus, rather than being transmitted with a uniform cross sectional area as shown by beam 103 in FIG. 1, the light beam diverges with an increasing cross-section area as the distance from the transmit telescope 401 increases. This, therefore, increases the likelihood that the diverging transmitted beam 403 will be incident upon the optical fiber, 412 in FIG. 4, located at the focal plane of the receive telescope. This increase in the beam's cross-sectional area results, however, in a reduced signal power for any given cross-sectional area at the receive telescope, 402 in FIG. 4, as compared to a focused beam with a uniform cross-sectional area, since maximum received signal power is achieved with a focused non-diverged beam. Therefore, once the divergent transmitted beam is detected as being incident upon the receive telescope, and the transmit and receive telescopes are aligned in a manner as described below, the transmitted beam can again be focused by reducing the divergence through the movement of the optical fiber 406 in the z-direction back toward the focal plane of the transmit telescope. The smaller cross section of the transmitted beam thus results in more power per unit area of the transmitted beam at the receive telescope. Such variable divergence, followed by realignment, allows for achieving the greatest signal power possible by correcting any initial misalignment. This same method can also be used to correct any subsequent misalignment that occurs during communications operations between the transmit and receive telescopes.

In order to align the transmit and receive telescopes, a feedback mechanism is desirable to communicate information there between. Referring once again to FIG. 4, at receive telescope 402, the incoming light beam is converted by photo-detector 432 to an electrical signal, which is passed to receiver 429. Power meter 408 measures the signal power of the received signal and passes this measurement to controller 430. During initial alignment stages this received signal power may be zero or below a specified minimum level. Controller 430 then sends a signal to controller 415 at the transmit telescope to is initiate divergence of the transmitted light beam. When controller 415 receives this signal, it outputs a signal to motorized stage 416 that effects the movement of optical fiber 406 to the front of the focal plane of the transmit telescope 401 along the longitudinal axis of it's primary mirror (z-axis). It should be noted that any mechanism for moving the optical fiber at the focal plane of the transmit telescope in the z-direction, such as a calibrated indent using finite steps, may be used. Such devices are well known in the art. As previously described, this movement of the optical fiber to a point in front of the focal plane of the transmit telescope results in the divergence of transmitted light beam 403 such that it presents an increased cross-section at the receive telescope 402.

In order to realign the telescopes, it may be necessary to redirect the transmitted beam so that it is incident upon the receive telescope when the beam is not diverged. Therefore, in one embodiment of the present invention, the entire transmit telescope is moved using gimbals, or any well-known equivalent device, to redirect the transmitted beam so that it is incident upon the receive telescope. In another embodiment of the present invention, mirrors defined by a non-standard conic constant may be used in the optics of the transmit and receive telescopes 401 and 402, respectively. The use of such mirrors in free-space optical communications is the subject of the aforementioned copending patent applications which are incorporated herein by reference. Mirrors with a non-standard conic constant are advantageous in that their use in free-space optical communications obviates, within limits, the need to move the entire is transmit telescope structure to achieve initial alignment or to correct alignment during communications operations. Rather, by using such mirrors, the focal plane of the transmit and receive telescope is enlarged. By moving the transmit optical fiber within that enlarged focal plane, the resultant beam is transmitted in a different angular direction relative to the transmit telescope. Therefore, as opposed to moving the entire telescope apparatus 401 itself, as is necessary with prior art free-space communication telescopes, a transmit telescope utilizing mirrors with a non-standard conic constant may be aligned by moving optical fiber 406 in the x-y plane within the focal plane of the transmit telescope so that the transmitted beam is incident upon the receive telescope.

Any misalignment due to movement of the transmit telescope may be corrected by moving either the transmit telescope or the transmit optical fiber, as described above. However, in cases where the receive telescope is not aligned with the transmit telescope, or where there are multiple cells of turbulence or attenuation in the atmosphere, it may be necessary to also move the receive telescope to achieve alignment. Therefore, in another embodiment of the present invention, the entire receive telescope 402 is moved using gimbals, or any well-known equivalent devices, to achieve alignment between the transmit and receive telescopes and, accordingly, maximize received signal power. Once again, however, in another embodiment of the present invention utilizing mirrors with a non-standard conic constant in the receive telescope, moving the entire receive telescope may be unnecessary. Rather, as in the transmit telescope, a receive telescope utilizing mirrors with a non-standard conic constant may be aligned with the transmit telescope by moving optical fiber 412 in the x-y plane within the focal plane of the receive telescope so that the transmitted beam is incident upon the receive optical fiber.

As the entire receive transmit telescope 401 or receive telescope 402 (or, respectively, the optical fibers 406 or 412 of those telescopes) is moved such that the light beam 403 is incident upon the receive optical fiber 412, the divergence of the transmitted beam 403 may be decreased to achieve a more focused transmitted beam 403. To effect this increased focus, controller 430 at the receive telescope sends a signal to controller 415 at the transmit telescope that will cause it to reduce the divergence of the transmitted beam. This is achieved through motorized stage 416, which moves optical fiber 406 to a point along the longitudinal axis of the primary mirror 420 (z-axis) of the transmit telescope that is closer to its focal plane. Iterative power measurements, followed by variations of the degree of divergence of the transmitted beam 403 and movements of the receive telescope 402 or the receive optical fiber 412 in response to those measurements, may be necessary to achieve alignment of the transmit and receive telescopes 401 and 402, respectively.

Once alignment has been achieved as described above, it may be determined that the resulting maximum power level is not the optimum level for communications operations. For example, in free-space telecommunications systems, the maximum transmitted power level must be such that communications are possible even in foggy or snowy atmospheric conditions. This means that in clear atmospheric conditions, for example, the maximum received power level may overload the receiver electronics. Therefore, if the received power exceeds a specified threshold, the power received by the receive optical fiber can be reduced by moving the optical fiber of either the transmit or receive telescope 401 and 402, respectively, along the z-axis of the primary mirror of the respective telescope.

Figure 5:
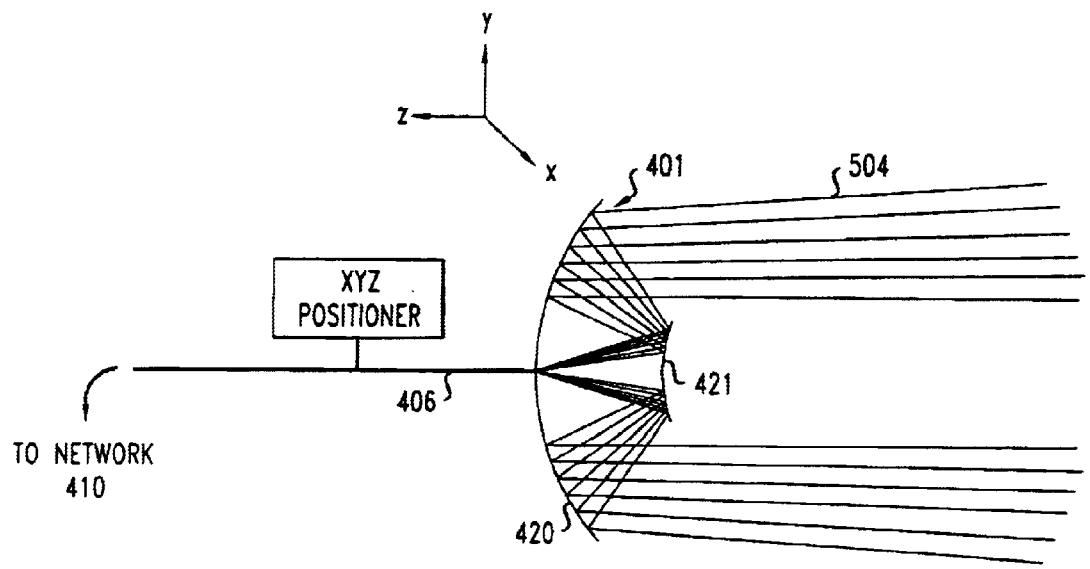
FIG. 5 shows the transmit telescope in the system of FIG. 4 that is capable of diverging the transmitted beam and, thus, maintaining received signal power below a specified threshold.

In the first case, this reduction in received power is accomplished by moving the transmit optical fiber 406 to a point in front of the focal plane of the transmit telescope along the z-axis of its primary mirror 420. During operation, if the received signal power measured by power meter 408 exceeds the specified threshold, controller 430 sends a signal to controller 415 at the transmit telescope to reduce the transmitted power. Controller 415 then sends a signal to motorized stage 416 to effect the movement of optical fiber 406 to a point in front of the focal plane along the axis of the transmit telescope's primary mirror (z-axis). With reference to FIG. 5, such a movement of the transmit optical fiber 406 causes the transmitted light beam 504 to diverge and, correspondingly, increases the cross-sectional area of the transmitted beam at the focal plane of the receive telescope. Also as previously described, this increase in the beam's cross-sectional area reduces the power per unit area of the cross section of the received signal, resulting in less power being incident upon the receive optical fiber, 412 in FIG. 4, at the focal plane of the receive telescope 402. Iterative measurements of received signal power by power meter 408 followed by feedback to the transmit controller 415 allow adjustment of the position of transmit optical fiber 406 to maintain the received power levels below the specified maximum power threshold. A similar reduction in received power may be achieved by moving the transmit optical fiber to the rear of the focal plane of the transmit telescope. However, such a movement would result in the transmitted beam converging at a point along the transmitted beam's path prior to being incident upon the receive telescope. A beam with a smaller cross section is more susceptible to distortion due to atmospheric disturbances than a beam with a larger cross section. As a result, absent corrective measures (e.g., adaptive optics) that reduce or eliminate such distortion, a reduction in received signal power by moving the transmit optical fiber to the rear of the focal plane may possibly lead to inferior signal quality received at the receive optical fiber.

Figure 6:
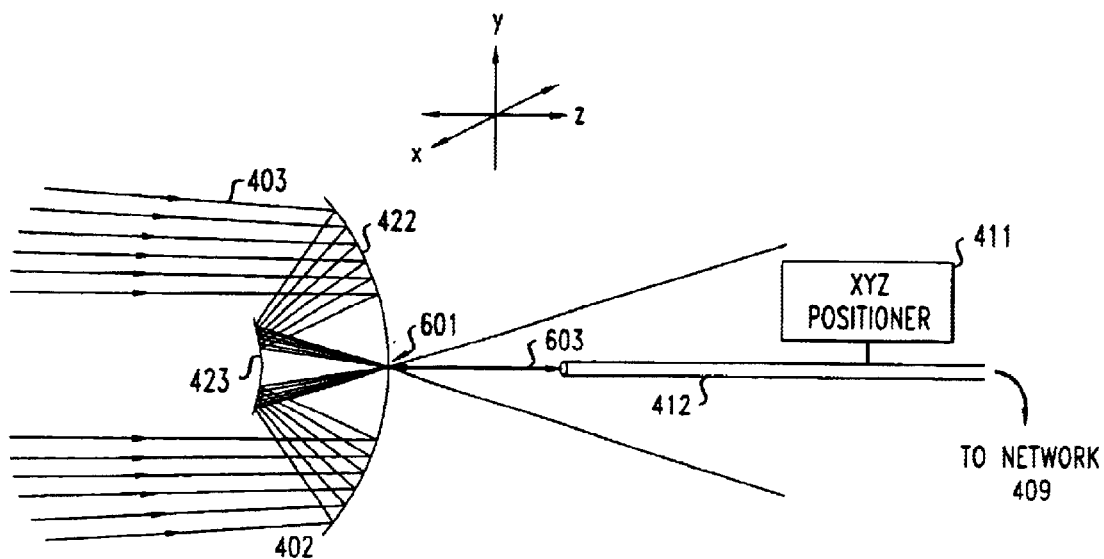
FIG. 6 shows the receive telescope in the system of FIG. 4 that is capable of maintaining received signal power below a specified threshold.

In the second case, when the received signal power exceeds the specified threshold, a reduction in received power is accomplished by moving the receive optical fiber in the z-direction along the axis of the receive telescope's primary mirror 422. In this case, the fiber optic may be moved either to a point in front of the focal plane of the receive telescope or, alternatively, to a point to the rear of the focal plane of the receive telescope. Either movement will result in a reduced signal power incident upon the receive optical fiber with no degradation in the received signal quality. FIG. 6 shows the case where the receive optical fiber is moved to a point to the rear of the receive focal plane. In this case, receive telescope 402 utilizes its primary and secondary mirrors 422 and 423, respectively, to focus the incoming light beam on point 601 within the focal plane of primary mirror 422. This focal point is the point of maximum received power. Once the incoming light beam passes focal point 601, however, it begins to diverge and, accordingly, the power per unit area of the beam decreases as the beam's distance past the focal point increases. If the power meter, 408 in FIG. 4 measures a received signal power that exceeds the specified threshold, controller 430 sends a signal to XYZ positioner 411 to effect the movement of optical fiber 412 to a point which is some distance from the rear of focal point 601, such as distance 603, thereby reducing the power incident upon the receive optical fiber. As previously discussed, a similar reduction of power may be achieved by moving the fiber to a point in front of the receive focal plane. By iteratively measuring the received power level at power meter 408, controller 430 may send signals to XYZ positioner 411 to adjust the location of receive optical fiber 412 to maintain optimum received power levels that do not exceed a specified power threshold.

The foregoing merely illustrates the principles of the invention. It will thus be appreciated that those skilled in the art will be able to devise various arrangements which, although not explicitly described or shown herein, embody the principles of the invention and are included in its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting aspects and embodiments of the invention, as well as specific examples thereof, are intended to encompass functional equivalents thereof.

Thus, for example, it should be apparent to one skilled in the art that diagrams herein represent conceptual views of optical telescopes and light beams modulated with data for the purposes of free-space optical communications. Diagrams of optical components are not necessarily accurate in dimension or in relationship to other components but are, instead, merely representative of possible physical arrangements of such components. Also, mirrors represent only one possible type of optical system that could be used in a free-space optical communication system. Any other structure that would provide the same function as the mirrors, such as, without limitation, lenses, could be used. Additionally, it will be apparent to one skilled in the art that all optical fibers depicted in the diagrams represent only one method of transmitting data between telescopes and network destinations. Any other communication method for passing data from the telescopes to network destinations is intended as an alternative to the method shown in the diagram, without limitation. Similarly, in the above described embodiments of the present invention, an optical fiber is located at or near the focal plane of the transmit and receive telescopes. One skilled in the art will recognize that any other device, such as, without limitation, a photo-detector, may be used as an alternative to accomplish the same function.

Additionally, in the above described embodiment of the present invention, the transmitted beam is made to diverge by moving the transmit optical fiber to a point in front of the focal plane of the primary mirror of the transmit telescope along the longitudinal axis of that mirror. One skilled in the art will recognize that the same effect would result by moving the fiber to a point behind the focal plane. The result of this movement of the fiber would be that the beam would first converge at a point between the transmit and receive telescope along the path of the beam. Then the beam would diverge which would allow the same alignment function to take place as in the case where a divergent beam was initially transmitted by the transmit telescope. While such beams of smaller cross sectional area are more susceptible to atmospheric disturbances, any such disturbance could be corrected through the use of adaptive optics or other corrective measures.

In the above embodiment, the controller at the receive telescope communicates the need to diverge the transmit light beam via traditional network connections. However, it should be obvious to one skilled in the art that this feedback information could be accomplished by many different methods including, without limitation, wireless radio frequency transmitters and receivers or even free-space light beam communication. This latter method could be accomplished using a second pair of telescopes, co-located with the transmitting and receiving telescopes. Such telescopes would not be required to communicate with high bandwidth and could, therefore, be less complex and less costly than the primary communications telescopes. Alternatively, the already existing transmitting and receiving telescopes could transmit the feedback signal, in addition to their primary communications function. In this case, the communications system could use a different frequency for the feedback signal to avoid interfering with the primary communications signal.

Other aspects of this invention are also merely representative in nature. For instance, while the embodiment presented utilizes traditional network connections to deliver information to and from the telescopes, wireless methods of communication could alternatively be used. Additionally, an XYZ controller is shown as the mechanism for moving receive telescope to bring it into alignment with the transmit telescope. There are many other functional equivalents for accomplishing this function, including without limitation, piezeo-electric drivers and voice-coil devices. The same holds true for the motorized stage used to move the optical fiber at the focal plane of the transmit telescope. Any device that is the functional equivalent of the drivers is intended to be encompassed by the present invention.

Finally, it will also be apparent to one skilled in the art that the different aspects of this invention may be implemented together in one communications system or, alternatively, any aspect of this invention may be implement as a "stand-alone" measure to increase communications availability. Nothing herein is intended to require that all aspects of the present invention be included in any single embodiment.

What is claimed is:

1. A transmit telescope comprising:
   means for transmitting a light beam to a receive telescope; and
   means operative, in response to a signal indicative of an excessive received signal power condition at the receive telescope, for adjusting the transmitted light beam so that it diverges as the light beam is transmitted by said transmitting means, thereby increasing the cross-sectional area of the transmitted beam incident upon the receive telescope.

2. The transmit telescope of claim 1 wherein the means for adjusting the light beam comprises means for moving a transmit telescope optical fiber, which delivers the light beam to the transmit telescope and which terminates at or near the focal plane of an optical system of the transmit telescope, to a point in front of said focal plane along the longitudinal axis of the optical system of the transmit telescope.

3. The transmit telescope of claim 1 wherein the signal indicative of an excessive received power condition is generated in response to at least one measurable signal parameter associated with the transmitted light beam received by the receive telescope.

4. The transmit telescope of claim 3 wherein the measurable signal parameter is signal power.

5. A receive telescope comprising:
   means for receiving a light beam transmitted by a transmit telescope;
   and means for generating a signal indicative of an excessive received power condition that is operative for adjusting the transmitted light beam so that it diverges as the light beam is transmitted by said transmit telescope, thereby increasing the cross-sectional area of the transmitted beam incident upon the receive telescope.

6. A receive telescope comprising:
   means for receiving a light beam from a transmit telescope; and
   means for moving a receive optical fiber to a point away from the focal plane of the receive telescope along the longitudinal axis of an optical system of the receive telescope, thereby increasing the cross-sectional area of the received light beam incident upon the receive optical fiber.

7. The receive telescope of claim 6 wherein moving the receive optical fiber to a point away from the focal plane comprises moving said fiber to a point in front of the receive focal plane.

8. The receive telescope of claim 6 wherein moving the receive optical fiber to a point away from the focal plane comprises moving said fiber to a point to the rear of the receive focal plane.

9. The receive telescope of claim 6 wherein the moving means moves said optical fiber in response to at least one measurable signal parameter associated with a signal transmitted in said receive telescope optical fiber.

10. The receive telescope of claim 9 wherein the measurable signal parameter is signal power.

11. A method in a free-space optical communication system comprising:
    increasing, in response to a signal indicative of an excessive received power condition, the cross-sectional area of a transmitted light beam incident upon a receive telescope by adjusting said beam so that it diverges as the light beam is transmitted by the transmit telescope.

12. The method of claim 11 wherein adjusting the beam so it diverges comprises moving a transmit telescope optical fiber, which delivers the light beam to the transmit telescope and which terminates at or near the focal plane of an optical system of the transmit telescope, to a point in front of said focal plane along the longitudinal axis of the optical system of the transmit telescope.

13. The method of claim 12 wherein the signal indicative of an excessive received power condition is generated in response to at least one measurable signal parameter associated with the received light beam.

14. The method of claim 13 wherein the measurable signal parameter is signal power.

15. A method in a free space optical communication system comprising:
    moving a receive optical fiber, located at or near the focal plane of an optical system of the receive telescope, along the longitudinal axis to a point away from a focal plane of an optical system of the receive telescope, thereby increasing the cross-sectional area of a received light beam incident upon the receive optical fiber.

16. The method of claim 15 wherein moving the receive optical fiber to a point away from the focal plane comprises moving said fiber to a point in front of the receive focal plane.

17. The method of claim 15 wherein moving the receive optical fiber to a point away from the focal plane comprises moving said fiber to a point to the rear of said focal plane.

18. The method of claim 15 further comprising moving the receive optical fiber in response to at least one measurable signal parameter associated with a signal transmitted in said optical fiber.

19. The method of claim 18 wherein the measurable signal parameter is signal power.

20. A free space optical communication system comprising:
    a transmit telescope for transmitting a light beam;
    a receive telescope for receiving the transmitted light beam; and
    means operative, in response to a signal indicative of an excessive received power condition at the receive telescope, for adjusting the transmitted light beam so that it diverges as the light beam is transmitted by said transmit telescope transmitting means, thereby increasing the cross-sectional area of the transmitted beam incident upon the receive telescope.

21. The system of claim 20 wherein the means for adjusting the light beam so that it diverges comprises means for moving a transmit telescope optical fiber, which delivers the light beam to the transmit telescope and which terminates at or near the focal plane of the optical system of the transmit telescope, to a point in front of said focal plane along the longitudinal axis of an optical system of the transmit telescope.

22. The system of claim 20 wherein the signal indicative of an excessive received power condition is generated in response to at least one measurable signal parameter associated with the transmitted light beam received by the receive telescope.

23. A free space optical communication system comprising:

a transmit telescope for transmitting a light beam;

a receive receive optical fiber located at or near the focal plane of an optical system of a receive telescope; and means operative, in response to a signal indicative of an excessive received power condition at the receive telescope, for adjusting the transmitted light beam so that it diverges as the light beam is transmitted by said transmit telescope, thereby increasing the cross-sectional area of the transmitted beam incident upon the receive telescope.

24. The system of claim 23 wherein the adjusting means comprises means for moving the receive optical fiber to a point away from the focal plane of the receive telescope along the longitudinal axis of the optical system of the receive telescope.

25. The system of claim 24 wherein the moving means moves said optical fiber in response to at least one measurable signal parameter associated with a signal transmitted in said telescope optical fiber.

26. The system of claim 25 wherein the measurable signal parameter is signal power.

* * * * *